United States Patent
Jung et al.

(10) Patent No.: US 11,937,188 B2
(45) Date of Patent: Mar. 19, 2024

(54) TRANSMISSION POWER CONTROL OF SOUNDING REFERENCE SIGNALS IN WIRELESS COMMUNICATION SYSTEM AND DEVICE

(71) Applicant: SAMSUNG ELECTRONICS CO., LTD., Suwon-si (KR)

(72) Inventors: Youngseok Jung, Suwon-si (KR); Inhyoung Kim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/181,090

(22) Filed: Mar. 9, 2023

(65) Prior Publication Data

US 2023/0217377 A1 Jul. 6, 2023

Related U.S. Application Data

(63) Continuation of application No. 17/104,245, filed on Nov. 25, 2020, now Pat. No. 11,627,536.

(30) Foreign Application Priority Data

Nov. 28, 2019 (KR) .................. 10-2019-0156109
Jun. 11, 2020 (KR) .................. 10-2020-0071031

(51) Int. Cl.
*H04W 52/42* (2009.01)
*H04W 24/08* (2009.01)
(Continued)

(52) U.S. Cl.
CPC ......... *H04W 52/325* (2013.01); *H04W 24/08* (2013.01); *H04W 52/241* (2013.01);
(Continued)

(58) Field of Classification Search
CPC . H04W 52/325; H04W 24/08; H04W 52/241; H04W 52/242; H04W 52/245;
(Continued)

(56) References Cited

U.S. PATENT DOCUMENTS 8,064,945 B2  11/2011  Murakami et al.
8,170,634 B2  5/2012  Howard et al.
(Continued)

FOREIGN PATENT DOCUMENTS

KR  10-2010-0089452    8/2010
WO  2009023825 A2     2/2009
(Continued)

OTHER PUBLICATIONS

European Partial Search Report dated Apr. 7, 2021 for corresponding European Application No. 20209216.9 (13 pages).
(Continued)

*Primary Examiner* — Hoang-Chuong Q Vu
(74) *Attorney, Agent, or Firm* — F. CHAU & ASSOCIATES, LLC

(57) ABSTRACT

An operating method of a wireless communication device configured to perform wireless communication with a cell. The method involves identifying, from a downlink signal received from the cell, an electromagnetic field state associated with an antenna of the wireless communication device. A power compensation mode for compensating transmission power of a sounding reference signal is selected based on the identified electromagnetic field state. The transmission power of the sounding reference signal is compensated based on the selected power compensation mode. The sounding reference signal is transmitted with the compensated transmission power through the antenna to the cell.

6 Claims, 15 Drawing Sheets

Table1

|  | FIRST TRANSMISSION POWER COMPENSATION PARAMETER | RECEIVED POWER COMPENSATION PARAMETER | SECOND TRANSMISSION POWER COMPENSATION PARAMETER |
|---|---|---|---|
| FIRST ANTENNA | $PM_{TX1,1}$ | $PM_{RX1}$ | $PM_{TX2,1}$ |
| SECOND ANTENNA | $PM_{TX1,2}$ | $PM_{RX2}$ | $PM_{TX2,2}$ |
| THIRD ANTENNA | $PM_{TX1,3}$ | $PM_{RX3}$ | $PM_{TX3,3}$ |

(51) Int. Cl.
*H04W 52/24* (2009.01)
*H04W 52/32* (2009.01)
*H04B 7/06* (2006.01)

(52) U.S. Cl.
CPC ....... *H04W 52/242* (2013.01); *H04W 52/245* (2013.01); *H04W 52/42* (2013.01); *H04B 7/0626* (2013.01)

(58) Field of Classification Search
CPC . H04W 52/146; H04W 52/367; H04W 52/24; H04W 52/42; H04B 7/0617; H04L 5/0048

See application file for complete search history.

(56) References Cited

U.S. PATENT DOCUMENTS

| | | | |
|---|---|---|---|
| 8,625,693 B2 | 1/2014 | Tsai et al. | |
| 10,075,271 B2 | 9/2018 | Soriaga et al. | |
| 10,439,847 B2 | 10/2019 | Park et al. | |
| 10,917,895 B2 | 2/2021 | Tang et al. | |
| 11,026,189 B2 | 6/2021 | Vintola et al. | |
| 2016/0165547 A1* | 6/2016 | Ouchi | H04L 5/14 455/522 |
| 2018/0063801 A1 | 3/2018 | Lu et al. | |
| 2019/0191382 A1 | 6/2019 | Zhang | |
| 2019/0349864 A1 | 11/2019 | Zhang et al. | |
| 2020/0136696 A1 | 4/2020 | El-Rayis et al. | |
| 2020/0343918 A1 | 10/2020 | Faraone et al. | |
| 2021/0168731 A1 | 6/2021 | Jung et al. | |
| 2021/0235386 A1 | 7/2021 | Zhang et al. | |
| 2021/0250774 A1* | 8/2021 | Yerramalli | H04W 72/541 |
| 2021/0297959 A1* | 9/2021 | Zhou | H04L 5/0051 |
| 2021/0385756 A1 | 12/2021 | Zhang et al. | |
| 2021/0385760 A1 | 12/2021 | Guo et al. | |
| 2022/0225242 A1 | 7/2022 | Guan et al. | |
| 2022/0271815 A1 | 8/2022 | Zhang et al. | |

FOREIGN PATENT DOCUMENTS

| | | |
|---|---|---|
| WO | 2009023825 A3 | 2/2009 |
| WO | 2011017464 | 2/2011 |

OTHER PUBLICATIONS

European Partial Search Report dated Jul. 7, 2021 for corresponding European Application No. 20209216.9 (13 pages).

* cited by examiner

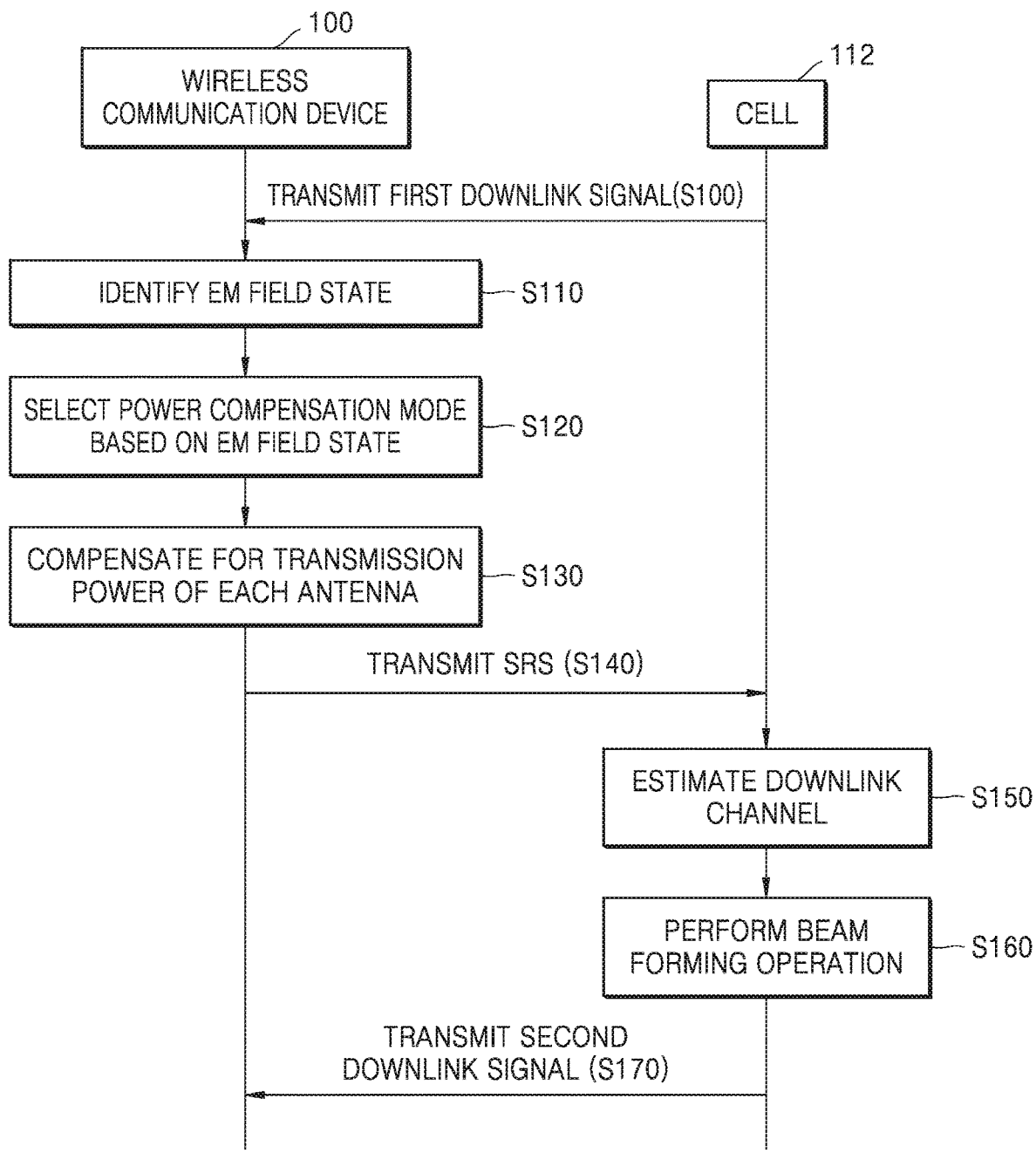

FIG. 9

Table1

|  | FIRST TRANSMISSION POWER COMPENSATION PARAMETER | RECEIVED POWER COMPENSATION PARAMETER | SECOND TRANSMISSION POWER COMPENSATION PARAMETER |
|---|---|---|---|
| FIRST ANTENNA | $PM_{TX1,1}$ | $PM_{RX1}$ | $PM_{TX2,1}$ |
| SECOND ANTENNA | $PM_{TX1,2}$ | $PM_{RX2}$ | $PM_{TX2,2}$ |
| THIRD ANTENNA | $PM_{TX1,3}$ | $PM_{RX3}$ | $PM_{TX3,3}$ | ent.

TRANSMISSION POWER CONTROL OF SOUNDING REFERENCE SIGNALS IN WIRELESS COMMUNICATION SYSTEM AND DEVICE

CROSS-REFERENCE TO RELATED APPLICATIONS

This application is a continuation under 35 U.S.C. 120 of U.S. patent application Ser. No. 17/104,245, filed on Nov. 25, 2020 in the United States Patent and Trademark Office, which claims the benefit of Korean Patent Application Nos. 10-2019-0156109 and 10-2020-0071031, filed on Nov. 28, 2019 and Jun. 11, 2020, respectively, in the Korean Intellectual Property Office, the disclosures of which are incorporated herein by reference in their entireties.

TECHNICAL FIELD

This disclosure relates generally to wireless communication and more particularly to a wireless communication system and device in which sounding reference signals are transmitted for channel measurements and beamforming.

DISCUSSION OF THE RELATED ART

Beamforming in today's wireless communication systems involves the transmission of directional signals using an antenna array comprising a plurality of antennas. As an example, a base station (also referred to as a "cell") transmits a downlink signal to a wireless communication device using a beamforming method in which beam pointing direction, beam pattern, and/or allocated frequencies may be set or changed based on a current signal propagation environment, generally referred to as channel state information. Considering that radio channels are reciprocal between the uplink and the downlink between the cell and the wireless communication device, it may be assumed that an uplink channel state is the same as, or similar to, a downlink channel state. The channel reciprocity assumption is effective in a time division duplex (TDD) system in which the uplink and the downlink share the same frequency spectrum and are separated in the time domain.

The cell receives a sounding reference signal (SRS) transmitted via at least one antenna of the wireless communication device. For example, when a wireless communication device includes a plurality of antennas, one antenna at a time may be sequentially selected for transmitting the sounding reference signal to the cell. The cell estimates the uplink channel with respect to each antenna of the wireless communication device, and may set beamforming parameters for downlink signal transmission based on the estimated uplink channel considering channel reciprocity.

The sounding reference signal is used mainly for a channel quality measurement to perform frequency-selective scheduling of the uplink, and does not include uplink data or control information. However, the sounding reference signal may be used for various purposes such as improving power control or supporting various start-up functions of wireless communication devices which have not been recently scheduled.

To realize the benefits of beamforming-based wireless communication based on channel reciprocity, the uplink channel should be accurately estimated, and to this end, the cell should receive sounding reference signals that fully reflect the uplink channel state.

SUMMARY

Embodiments of the inventive concept provide a wireless communication device that allows for performance improvement in wireless communication based on channel reciprocity, and a wireless communication system including the same.

According to an aspect of the inventive concept, there is provided an operating method of a wireless communication device configured to perform wireless communication with a cell. The method includes identifying, from a downlink signal received from the cell, an electromagnetic field state associated with an antenna of the wireless communication device. A power compensation mode for compensating transmission power of a sounding reference signal is selected based on the identified electromagnetic field state. The transmission power of the sounding reference signal is compensated based on the selected power compensation mode. The sounding reference signal is transmitted with the compensated transmission power through the antenna to the cell.

According to another aspect of the inventive concept, there is provided an operating method of a cell configured to perform wireless communication with a wireless communication device. The method involves: estimating a downlink channel of an antenna of the wireless communication device from an uplink signal received from the wireless communication device; identifying an electromagnetic field state of the wireless communication device; adjusting the estimated downlink channel of the antenna based on the identified electromagnetic field state; calculating a beam forming matrix based on the adjusted downlink channel of each antenna; and transmitting a downlink signal that is generated based on the calculated beam forming matrix to the wireless communication device.

According to another aspect of the inventive concept, there is provided an operating method of a wireless communication system including a cell and a wireless communication device configured to communicate with each other. The method includes: identifying, by the wireless communication device, an electromagnetic field state from a downlink signal received by an antenna of the wireless communication device from the cell; when the identified electromagnetic field state is a strong electromagnetic field state, compensating, by the wireless communication device, transmission power of a sounding reference signal transmitted through the antenna using a second transmission power compensation parameter generated through use of a first transmission power compensation parameter corresponding to an internal path loss of the antenna and a received power compensation parameter corresponding to a downlink channel state of the antenna; and transmitting, by the wireless communication device, the sounding reference signal to the cell with the compensated transmission power.

According to another aspect of the inventive concept, there is provided a wireless communication device including: a plurality of antennas; a plurality of power amplifiers respectively connected to the plurality of antennas; and a processor configured to control transmission power through each antenna of the plurality of antennas via the plurality of power amplifiers, wherein the processor identifies an electromagnetic field state from a downlink signal received from a cell via the plurality of antennas, selects a power compensation mode for transmission power of a sounding reference signal based on the identified electromagnetic field state, and compensates the transmission power of a sounding reference signal transmitted through each antenna based on the selected power compensation mode.

BRIEF DESCRIPTION OF THE DRAWINGS

Embodiments of the inventive concept will be more clearly understood from the following detailed description taken in conjunction with the accompanying drawings in which:

FIG. 4 is a flowchart of an operating method of a wireless communication system, according to an example embodiment of the inventive concept;

FIG. 9 is a table for describing a power compensation parameter corresponding to each antenna in FIG. 8;

DETAILED DESCRIPTION OF EMBODIMENTS

Figure 1A:
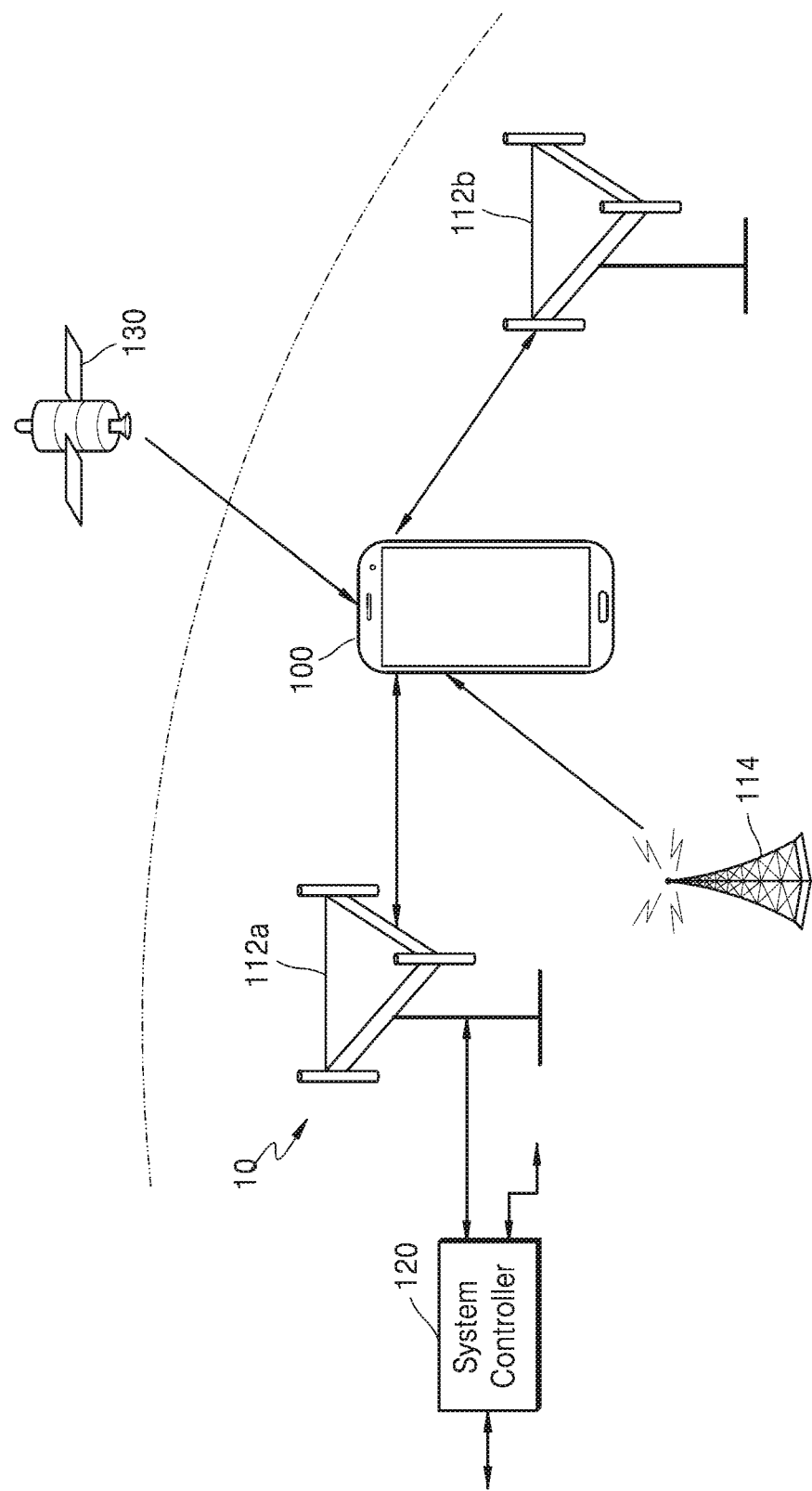
FIG. 1A is a schematic block diagram of a wireless communication system according to an example embodiment of the inventive concept.

Hereinafter, embodiments of the inventive concept are described in detail with reference to the accompanying drawings in which like reference characters designate like elements or features.

Herein, the phrase "uplink channel of an antenna" means an uplink channel with respect to the antenna. Signals are transmitted by an antenna of a wireless communication device to a cell through the uplink channel of the antenna. Similarly, the phrase "downlink channel of an antenna" means a downlink channel with respect to the antenna. Signals are transmitted from a cell to an antenna of a wireless communication device through the downlink channel of the antenna.

Herein, the phrase "transmission power of an antenna" means transmission power of a signal transmitted through the antenna.

Herein, the phrase "compensate for the transmission power of an antenna" refers, in some cases, to a transmission power adjustment to a signal that is made to compensate for propagation path loss between a cell and an antenna of a wireless communication device. In an example, if the propagation path loss to the antenna is relatively low, the electromagnetic field strength of a downlink signal received at the antenna is relatively strong, resulting in a "strong field state" at the antenna. In this case, due to channel reciprocity, an uplink SRS signal transmitted by the wireless communication device through the antenna, using a reference signal power at the same frequency, may arrive at the cell at a first power level. On the other hand, if the propagation path loss to the antenna is relatively high, this results in a "weak field state" at the antenna for a downlink signal. In this case, if an SRS signal is transmitted from the antenna to the cell at the same reference signal power as in the previous case, the SRS signal would arrive at the cell at a second power level lower than the first power level. However, it may be desirable for all of the SRS signals transmitted from respective antennas and/or at different test frequencies to arrive at the cell within a predetermined power level range and/or below a maximum power level. Therefore, it may be desirable to reduce the transmission power of the SRS signal when the strong field state exists, so as to reduce the signal level of the uplink signal when it arrives at the cell. Thus, a compensation for the transmission power of an antenna under these circumstances may be a reduction in the transmission power. When a weak field state is detected, compensation for the propagation loss between the cell and the wireless communication device may not be made. A transmission power compensation may also be made (in either the strong field state or weak field state cases) to compensate for differences in internal signal path losses to the antenna within the wireless communication device.

Figure 1B:
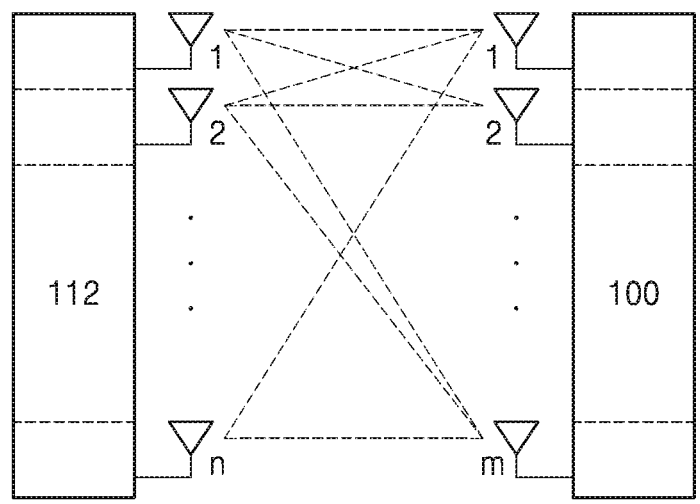
FIGS. 1B and 1C are diagrams for explaining wireless channels between a wireless communication device and a cell.
Figure 1C:
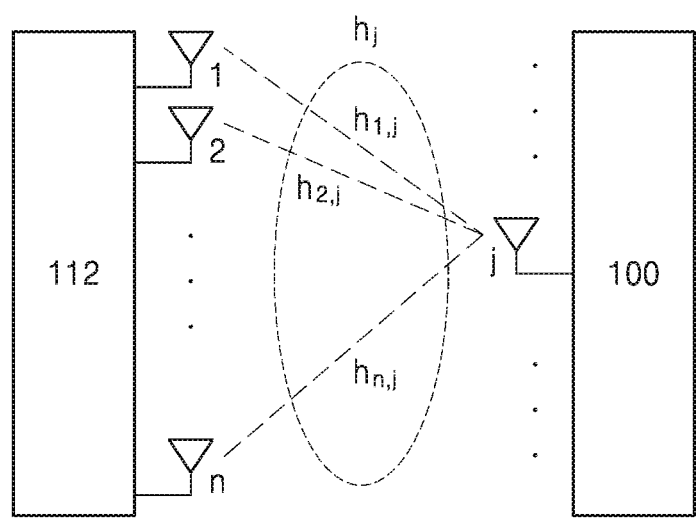

FIG. 1A is a schematic block diagram of a wireless communication system 10 according to an example embodiment of the inventive concept, and FIGS. 1B and 1C are diagrams for explaining wireless channels between a wireless communication device 100 and a cell 112.

Some examples of wireless communication system 10 include a new radio (NR) system, a 5th generation (5G) wireless system, a long term evolution (LTE) system, an LTE-Advanced system, a code division multiple (CDMA) system, a global system for mobile communications (GSM), and a wireless local area network (WLAN) system. A CDMA system may also be implemented in various CDMA versions such as wideband CDMA (WCDMA), time division synchronous CDMA (TD-SCDMA), and cdma2000. Below, the wireless communication system 10 is described mainly with reference to a 5G system and/or an LTE system, but example embodiments of the inventive concept are not limited thereto.

A wireless communication network of the wireless communication system 10 may support multiple users to communicate with each other by sharing available network resources. For example, in the wireless communication network, information may be transmitted using one or more connection methods such as CDMA, frequency division multiple access (FDMA), time division multiple access (TDMA), orthogonal frequency division multiple (OFDM) access (OFDMA), single carrier frequency division multiple access (SC-FDMA), OFDM-FDMA, OFDM-TDMA, and OFDM-CDMA.

The wireless communication device 100 may be user equipment (UE) in the wireless communication system 10. In some cases, the wireless communication device 100 may itself operate as a cell. As mentioned earlier, a cell may be generally referred to as a fixed station or base station communicating with a user device and/or another cell, and may exchange data and control information by communicating with the UE and/or the other cell. A base station (BS) may be a Node B, an evolved Node B (eNB), a sector, a site, a base transceiver system (BTS), an access point (AP), a relay node, a remote radio head (RRH), a radio unit (RU), a small cell, etc. In the present specification, the cell or the base station may be interpreted in a generic sense to denote some area or function covered by a base station controller (BSC) in CDMA, the Node-B in WCDMA, an eNode B (eNB) in LTE, or a sector, etc., and may encompass various coverage areas such as mega-cell, macro-cell, micro-cell, pico-cell, femto-cell, the relay node, RRH, RU, a small cell communication range, etc.

The UE may be fixed or mobile, and may be any device that communicates with the cell to transceive data and/or control information. For example, a UE may be terminal equipment, a mobile station (MS), a mobile terminal (MT), a user terminal (UT), a subscriber station (SS), a handheld device, etc.

Referring to FIG. 1A, the wireless communication system 10 may include cells 112a and 112b and a system controller 120. (Other embodiments employ more or fewer cells and a plurality of network entities.) The cells 112a and 112b may communicate with the wireless communication device 100 or another cell to transceive data signals or control information. The wireless communication device 100 may communicate with the wireless communication system 10 and may receive signals from a broadcast station 114. Further, the wireless communication device 100 may receive signals from a satellite 130 of a global navigation satellite system (GNSS). The wireless communication device 100 may support radio technology for various methods of wireless communication.

Technical aspects of the inventive concept may be applied between communication subjects forming the uplink channel and the downlink channel in the wireless communication system 10. Hereinafter, descriptions are given mainly on the wireless communication device 100 and the cell 112 (e.g., 112a or 112b) as communication subjects to which technical aspects of the inventive concept are applied.

The wireless communication device 100 according to an example embodiment of the inventive concept may select a power compensation mode based on an electromagnetic (EM) field state (hereafter, just "field" state) formed in the communication coverage area of the cell 112, and transmission power of each antenna for transmission of a sounding reference signal may be compensated based on the selected power compensation mode. The field state of the wireless communication device 100 discussed in embodiments below may be classified into a strong field or a weak field, based on a comparison of signal power or quality with a certain reference value or criteria.

As an example embodiment, the wireless communication device 100 may operate in each of different power compensation modes in the strong field and the weak field. When the field state associated with a particular antenna of the device 100 is detected as the strong field, the wireless communication device 100 may operate in a first power compensation mode. In this mode, transmission power of SRS signals from the antenna may be reduced by an amount positively correlated with the strength or quality of the detected strong field. In this manner, due to channel reciprocity, SRS signals with excessive power may not appear at the cell, thereby reducing potential interference with communications involving other devices in the wireless communication system 10. The first power compensation mode may be understood as a mode that compensates power by taking "external noise" characteristics into primary consideration. When the field state is confirmed as the weak field, the wireless communication device 100 may operate in a second power compensation mode, where transmission power of SRS signals from the antenna is not reduced in relation to the strength or quality of the detected weak field. In this mode (as well as in the first power compensation mode), adjustments in transmission power may be made to compensate for variations in internal path losses to the respective antennas ("internal noise" characteristics are taken into primary consideration). The internal and external noise characteristics of the wireless communication device 100 in the strong field and the weak field are described later with respect to FIGS. 5A and 5B, respectively.

The wireless communication device 100 may operate in the power compensation mode selected according to the field state, and transmit the sounding reference signal to the cell 112 of each antenna based on the compensated transmission power of each antenna. For example, when the wireless communication device 100 includes a first antenna and a second antenna, the transmission power of the sounding reference signal corresponding to the first antenna may be compensated, and by using the compensated transmission power, the sounding reference signal may be transmitted to the cell 112 via the first antenna. Next, the wireless communication device 100 may compensate for the transmission power of the sounding reference signal corresponding to the second antenna, and by using the compensated transmission power, transmit the sounding reference signal to the cell 112 via the second antenna.

As an example embodiment, the cell 112 may estimate the downlink channel of each antenna of the wireless communication device 100 based on the sounding reference signal received from the wireless communication device 100. The cell 112 may estimate the uplink channel of each antenna of the wireless communication device 100 by using the received sounding reference signal, and may estimate the downlink channel of each antenna by regarding the estimated uplink channel of each antenna as the same as or similar to the downlink channel according to channel reciprocity. The cell 112 may calculate a beamforming matrix based on the estimated downlink channel of each antenna. The cell 112 may transmit the downlink signal generated based on the calculated beamforming matrix to the wireless communication device 100 via a plurality of antennas.

However, in other embodiments the wireless communication device 100 may operate in the same power compensation mode when transmitting the sounding reference signal regardless of the field state, and in this case, the cell 112 may operate differently according to the field state thereof when estimating the downlink channel per each antenna.

The cell 112 may estimate the downlink channel of each antenna of the wireless communication device 100 from the uplink signal received from the wireless communication device 100. The uplink signal may include the sounding reference signal transmitted of each antenna of the wireless communication device 100. Furthermore, the uplink signal may include information indicating quality of the downlink channel of each antenna of the wireless communication device 100. The cell 112 may estimate the downlink channel of each antenna of the wireless communication device 100 from the uplink signal, identify the field state of the wireless communication device 100, and adjust the downlink channel of each antenna of the wireless communication device 100 that has been estimated based on the identified field state. The cell 112 may calculate the beamforming matrix based on the adjusted downlink channel of each antenna, and transmit the downlink signal generated based on the calculated beamforming matrix to the wireless communication device 100 via the plurality of antennas. In other words, the cell 112 may adjust the estimated downlink channel of each antenna of the wireless communication device 100 so that the channel reciprocity is satisfied considering noise characteristics that vary depending on the field state of the wireless communication device 100.

The wireless communication system 10 according to an example embodiment of the inventive concept may compensate for the transmission power of the sounding reference signal considering the field state of the wireless communication device 100, or generate an environment that satisfies the channel reciprocity by adjusting the downlink channel of each antenna of the estimated wireless communication device 100, and perform the beamforming-based communication having improved performance.

Referring FIG. 1B, the wireless communication device 100 may include m antennas, and the cell 112 may include n antennas. The wireless communication device 100 and the cell 112 may perform mutual beamforming-based communication, multiple-input and multiple-output (MIMO)-based communication, and the like by using respective antennas. Because theoretical channel transmission capacity is increased due to the configuration of FIG. 1B, a transfer rate may be increased and the spectral efficiency may be improved.

Referring FIG. 1C, an uplink channel from a $j^{th}$ antenna (j=any integer from 1 to m) of the wireless communication device 100 to the n antennas of the cell 112 may be expressed as equation 1:

$$h_j^T = [h_{1,j}, h_{2,j}, \ldots, h_{n,j}] \quad \text{(eqn. 1)}$$

In other words, the uplink channel $h_j$ corresponding to the $j^{th}$ antenna of the wireless communication device 100 may include channels $h_{1,j}, h_{2,j}, \ldots, h_{n,j}$ respectively corresponding to the n antennas of the cell 112. The cell 112 may receive the sounding reference signal transmitted by the $j^{th}$ antenna of the wireless communication device 100, and estimate the uplink channel $h_j$ through use of the received sounding reference signal. The cell 112 may obtain the downlink channel from the uplink channel $h_j$ considering channel reciprocity, generate the downlink signal using the obtained downlink channel, and transmit the downlink signal to the wireless communication device 100 via at least one of the n antennas.

Descriptions on the uplink channel $h_j$ corresponding to the $j^{th}$ antenna of the wireless communication device 100 may be applied to the uplink channels corresponding to other antennas of the wireless communication device 100, and the technical aspects of the inventive concept are described below based on the descriptions given above.

Figure 2:
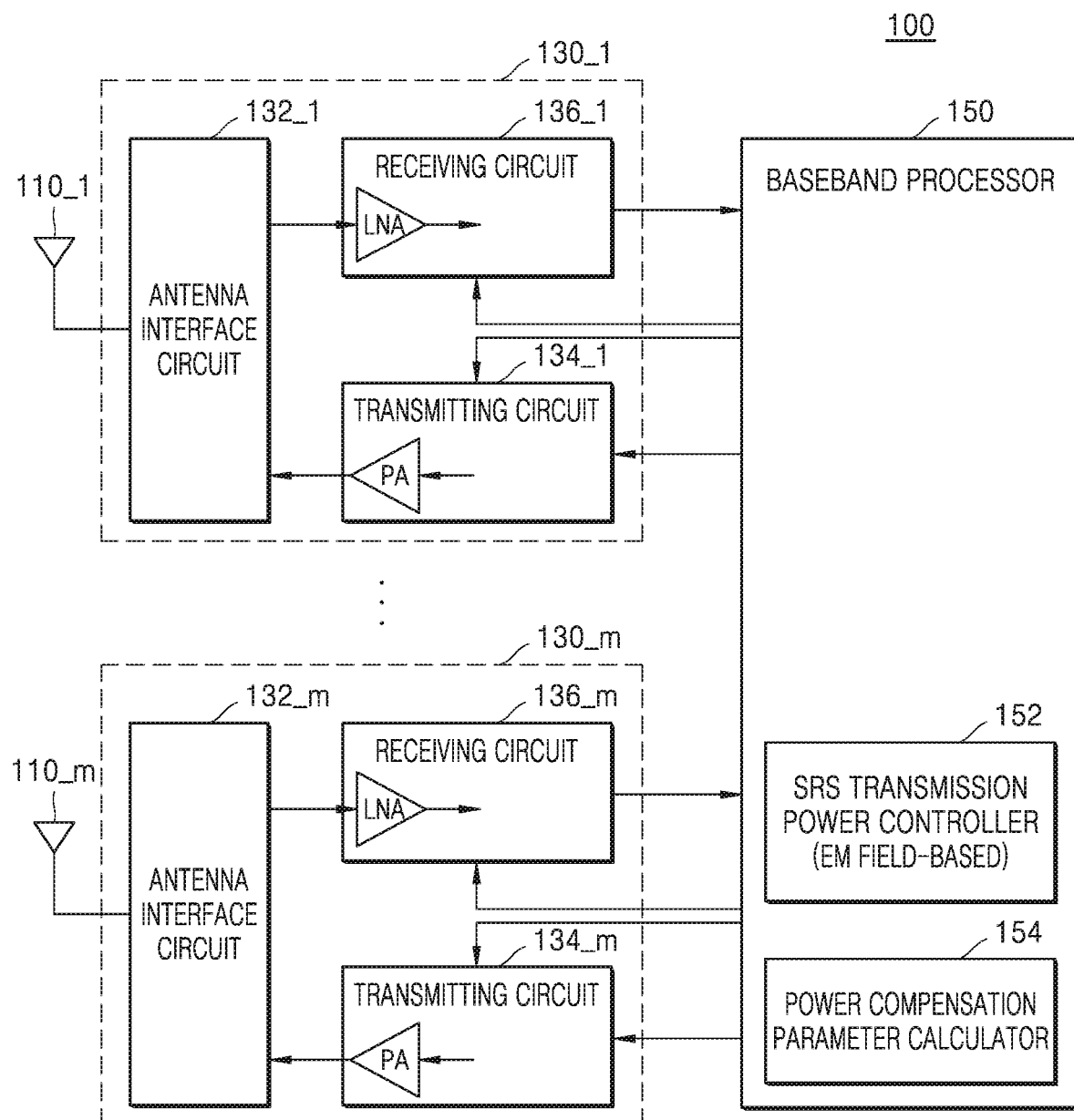
FIG. 2 is a block diagram illustrating a wireless communication device according to an example embodiment of the inventive concept.

FIG. 2 is a block diagram illustrating the wireless communication device 100 according to an example embodiment of the inventive concept.

Referring to FIG. 2, the wireless communication device 100 may include first through $m^{th}$ antennas 110_1 through 110_m, first through $m^{th}$ radio frequency integrated circuits (RFIC) 130_1 through 130_m, and a baseband processor 150. The first RFIC 130_1 may include an antenna interface circuit 132_1, a transmitting circuit 134_1, and a receiving circuit 136_1. The antenna interface circuit 132_1 may connect the first antenna 110_1 to any one of the transmitting circuit 134_1 and the receiving circuit 136_1. The transmission circuit 134_1 may convert a digital signal received from the baseband processor 150 into an analog signal, amplify the analog signal to a desired frequency band, amplify the result by using a power amplifier (PA), and then output the amplified result as the uplink signal. The receiving circuit 136_1 may amplify the downlink signal received from the first antenna 110_1 by using a low noise amplifier (LNA), adjust the frequency of the amplified downlink signal down to the baseband band, and then convert the adjusted amplified downlink signal to a digital signal. The receiving circuit 136_1 may provide the digital signal to the baseband processor 150. The first RFIC 130_1 described above may also be applied to the configuration of the second through $m^{th}$ RFICs 130_2 through 130_m, and detailed descriptions thereof are omitted.

The baseband processor 150 according to the example embodiment of the inventive concept may include a sounding reference signal (SRS) transmission power controller 152 and a power compensation parameter operator 154. The SRS transmission power controller 152 may select the power compensation mode based on the field state of the wireless communication device 100, and compensate transmission power of each antenna for transmission of the sounding reference signal based on the selected power compensation mode.

The SRS transmission power controller 152 may first determine the field state of the wireless communication device 100. As an example embodiment, the SRS transmission power controller 152 may measure received signal strength from the downlink signals received via the first through $m^{th}$ antennas 110_1 through 110_m. For example, the SRS transmission power controller 152 may measure reference signal received power (RSRP) from a reference signal included in the downlink signal, and the received signal strength may include the RSRP. In some embodiments, the received signal strength may include at least one of reference signal received quality (RSRQ), a signal-to-interference-and-noise ratio (SINR), and a received signal strength indicator (RSSI).

The SRS transmission power controller 152 may compare the measured received signal strength with a reference value, and determine the field state of the wireless communication device 100 based on a comparison result. For example, when the measured received signal strength exceeds the reference value, the SRS transmission power controller 152 may determine the field state of the wireless communication device 100 as a strong field, and when the measured received signal strength is equal to or less than the reference value, the SRS transmission power controller 152 may determine the field state of the wireless communication device 100 as a weak field.

The SRS transmission power controller 152 may compensate the transmission power of each antenna for transmission of the SRS by using the second transmission power compensation parameter that has been generated by using the first transmission power compensation parameter and the received power compensation parameter in the strong field. The SRS transmission power controller 152 may compensate the transmission power of each antenna for transmission of the SRS by using the first transmission power compensation parameter in the weak field. The first transmission power compensation parameter may correspond to a parameter corresponding to an internal path loss of each antenna. The internal path loss of each antenna may include losses corresponding to respective paths from the first through $m^{th}$ antennas 110_1 through 110_m to respective power amplifiers PA.

For example, the SRS transmission power controller 152 may apply the first transmission power compensation parameter corresponding to the internal path loss between the power amplifier PA and the $j^{th}$ antenna 110_j to the reference power to compensate for the transmission power of the SRS transmitted via the $j^{th}$ antenna 110_j in the weak field. The SRS transmission power controller 152 in the weak field may compensate for the transmission power per antenna as follows:

$$x_j = PM_{TX1,j} \times P_{REF} \times s \qquad \text{(eqn. 2)}$$

The SRS transmission power controller 152 may transmit an output signal s via the $j^{th}$ antenna 110_j by multiplying the reference power P REF and the first transmission parameter $PM_{TX1,j}$ by the sounding reference signal $x_j$. As an example embodiment, the first transmission power compensation parameter may be proportional to the internal path loss, and the SRSs sequentially output via the first through $m^{th}$ antennas 110_1 through 110_m by performing the compensation operation of the SRS transmission power controller 152 described above may have the same or similar power. In eqn. 2, the reference power $P_{REF}$ may be preset and may be equally applied to the first through $m^{th}$ antennas 110_1 through 110_m.

In addition, the SRS transmission power controller 152 may apply the second transmission power compensation parameter to the reference power to compensate for the transmission power of the SRS transmitted via the $j^{th}$ antenna 110_j in the strong field. The SRS transmission power controller 152 in the strong field may compensate for the transmission power per antenna as follows:

$$x_j = PM_{TX2,j} \times P_{REF} \times s \qquad \text{eqn. 3}$$

$$PM_{TX2,j} = PM_{TX1,j} \times PM_{RX,j} \qquad \text{eqn. 4},$$

The SRS transmission power controller 152 may transmit the output signal s via the $j^{th}$ antenna 110_j by multiplying the reference power $P_{REF}$ and the second transmission power compensation parameter $PM_{TX2,j}$ by the SRS $x_j$. The second transmission power parameter $PM_{TX2,j}$ may correspond to a result value of multiplying the first transmission power compensation parameter $PM_{TX1,j}$ by a received power compensation parameter $PM_{RX,j}$. As an example embodiment, the received power compensation parameter $PM_{RX,j}$ may correspond to a parameter applied to the received power of each antenna so that the received power of each of the first through $m^{th}$ antennas 110_1 through 110_m includes target received power. For example, when the state of the downlink channel corresponding to the first antenna 110_1 is better than the state of the downlink channel corresponding to the second antenna 110_2, although the power magnitudes of signals output from the plurality of antennas of the cell 100 are the same, the received power of the signal received via the first antenna 110_1 experiencing the downlink channels may be greater than the received power of the signal received via the second antenna 110_2. A different received power compensation parameter may be applied to each of the received power of the signal received via the first antenna 110_1 and the received power of the signal received via the second antenna 110_2 to compensate with the same target received power. In an example embodiment, the received power compensation parameter may have a value inversely proportional to downlink channel quality. In summary, the SRS transmission power controller 152 may compensate for the transmission power of each antenna by further considering the downlink channel quality of each antenna in the strong field.

In an example embodiment, the power compensation parameter operator 154 may calculate in advance, for each antenna, the first and second transmission power compensation parameters and the received power compensation parameter that are to be used by the SRS transmission power controller 152, and provide them to the SRS transmission power controller 152. The power compensation parameter operator 154 may generate the first transmission power compensation parameter by using the internal path loss of each antenna, generate the received power compensation parameter by using the downlink channel quality of each antenna, and generate the second transmission power compensation parameter by using the first transmission power compensation parameter and the received power compensation parameter. In some embodiments, the power compensation parameter operator 154 may store the generated first and second transmission power compensation parameters and the generated received power compensation parameters in a memory, and may periodically or aperiodically update the first and second transmission power compensation parameters, and the received power compensation parameter.

In an example embodiment, the power compensation parameter operator 154 may generate the received power compensation parameter based on an average path loss of the downlink channel of each antenna. The average path loss of the downlink channel of each antenna may be defined as follows:

$$L_{DL,j} = \sqrt{\frac{N_{SC}}{\sum_{f=1}^{N_{SC}} \sum_{i=1}^{n} \| h_{i,j,f} \|^2}} \qquad \text{(eqn. 5)}$$

In eqn. 5, $L_{DL,j}$ is an average path loss of the downlink channel experienced by the downlink signal that is received by the $j^{th}$ antenna 110_j. $N_{SC}$ is the number of subcarriers, and $h_{i,j,f}$ is the downlink channel between the $i^{th}$ antenna of the cell 112 and the $j^{th}$ antenna 100_j of the wireless communication device 100. The power compensation parameter operator 154 may calculate the average path loss of the downlink channel of each antenna as shown in eqn. 5, and generate the received power compensation parameter of each antenna that is proportional to the average path loss of the downlink channel.

In an example embodiment, the power compensation parameter operator 154 may generate the received power compensation parameter based on received signal strength of each antenna. For example, the power compensation parameter operator 154 may measure the RSRP of each antenna, and generate the received power compensation parameter of each antenna that is inversely proportional to the measured RSRP.

In addition to the above embodiments, the power compensation parameter operator 154 may generate the received power compensation parameter of each antenna that is inversely proportional to the downlink channel quality in various other ways.

In an example embodiment, the SRS transmission power controller 152 may bias the power amplifiers PA included in each of first through $m^{th}$ transmission circuits 134_1 through 134_m to compensate the transmission power of the SRS of each antenna in the weak or strong field. However, this is only an example embodiment, and the inventive concept is not limited thereto. The SRS transmission power controller 152 may compensate the transmission power of the SRS of each antenna in various other ways.

The SRS transmission power controller 152 and the power compensation parameter operator 154 included in the baseband processor 150 may be variously implemented through use of software executed by a processor, or as hardware or a software/hardware mixed module. In addition, each characteristic operation of the SRS transmit power controller 152 and the power compensation parameter operator 154 may be integrally performed by the baseband processor 150.

Figure 3:
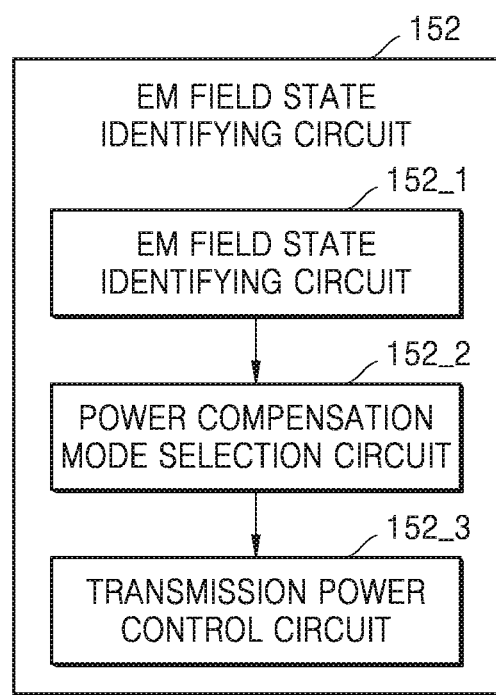
FIG. 3 is a block diagram of a sounding reference signal (SRS) transmission power controller in FIG. 2.

FIG. 3 is a block diagram of the SRS transmission power controller 152 in FIG. 2.

Referring to FIG. 3, the SRS transmission power controller 152 may include an field state identifying circuit 152_1, a power compensation mode selection circuit 152_2, and a transmission power control circuit 152_3. The field state identifying circuit 152_1 may identify the field state of the wireless communication device 100 by using the downlink signal received from the cell 112. For example, the field state identifying circuit 152_1 may measure the received signal strength of the reference signal included in the downlink signal, compare the measured received signal strength with the reference value, and identify the field state. Furthermore, the field state identifying circuit 152_1 may classify the field state of the wireless communication device 100 in detail by using various reference values.

The power compensation mode selection circuit 152_2 may select a power compensation mode for compensating for the transmission power of the SRS of each antenna based on the identified field state of the wireless communication device 100. The power compensation mode selection circuit 152_2 may select the first power compensation mode that compensates for the transmission power of each antenna by mainly considering characteristics of internal noise of the wireless communication device 100 in the strong field, and select the second power compensation mode that compensates for the transmission power of each antenna by mainly considering characteristics of external noise of the wireless communication device 100 in the weak field.

The SRS transmission power control circuit 152_3 may, when operating in the first power compensation mode, compensate for the transmission power of each antenna for transmission of the SRS by using the second transmission power compensation parameter that has been generated by using the first transmission power compensation parameter and the received power compensation parameter in the strong field. The SRS transmission power control circuit 152_3 may, when operating in the second power compensation mode, compensate for the transmission power of each antenna for transmission of the SRS by using the first transmission power compensation parameter.

FIG. 4 is a flowchart of an operating method of a wireless communication system, according to an example embodiment of the inventive concept.

Referring to FIG. 4, the wireless communication system may include the wireless communication device 100 and the cell 112, and the cell 112 may transmit the first downlink signal to the wireless communication device 100 (S100). The wireless communication device 100 may identify the field state thereof from the first downlink signal (S110). The wireless communication device 100 may measure at least one of the Reference Signal Received Power (RSRP), the Reference Signal Received Quality (RSRQ), the signal-to-interference-and-noise ratio (SINR), and the Received Signal Strength Indicator (RSSI) from the reference signal included in the downlink signal, and based on the measurement result, may determine whether the wireless communication device 100 is in the strong field or the weak field. The wireless communication device 100 may select the power compensation mode based on the field state (S120). For example, the wireless communication device 100 may select the first power compensation mode in the strong field and the second power compensation mode in the weak field. The wireless communication device 100 may select different power compensation modes according to the field states because the internal or external noise characteristics of the wireless communication device 100 are changed according to the field state. By performing the power compensation of the SRS of each antenna considering the internal or external noise characteristics according to the field state, the wireless communication device 100 may support the cell 112 so that the cell 112 accurately performs downlink channel estimation by using the channel reciprocity.

The wireless communication device 100 may compensate for the transmission power of the SRS of each antenna based on the selected power compensation mode (S130). The wireless communication device 100 may bias the power amplifier connected to each antenna to compensate for the transmission power of the SRS of each antenna. The wireless communication device 100 may sequentially select any one of the antennas and transmit the SRS having the compensated transmission power to the cell 112 (S140). The cell 112 may estimate the uplink channel of each antenna by using the SRS sequentially received from the antennas of the wireless communication device 100, and the downlink channel of each antenna may be estimated from the estimated uplink channel based on the channel reciprocity (S150). The cell 112 may calculate the beamforming matrix based on the downlink channel of each antenna, and perform the beamforming operation based on the calculated beamforming matrix (S160). The cell 112 may transmit the second downlink signal to the wireless communication device 100 based on the beamforming (S170).

Figure 5A:
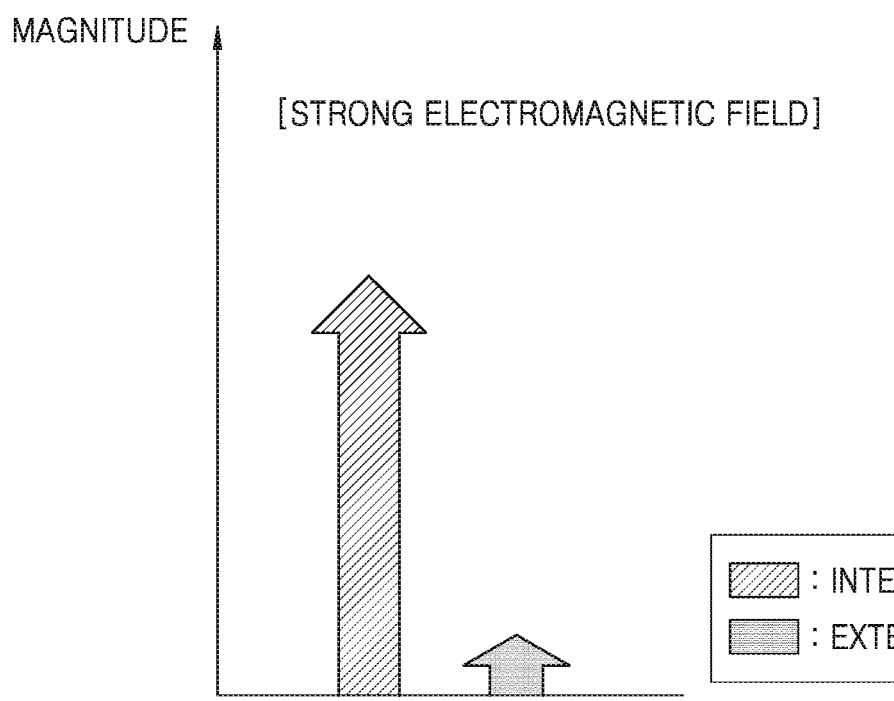
FIGS. 5A and 5B are graphs of magnitudes of noise in strong and weak electromagnetic fields of a wireless communication device, respectively.
Figure 5B:
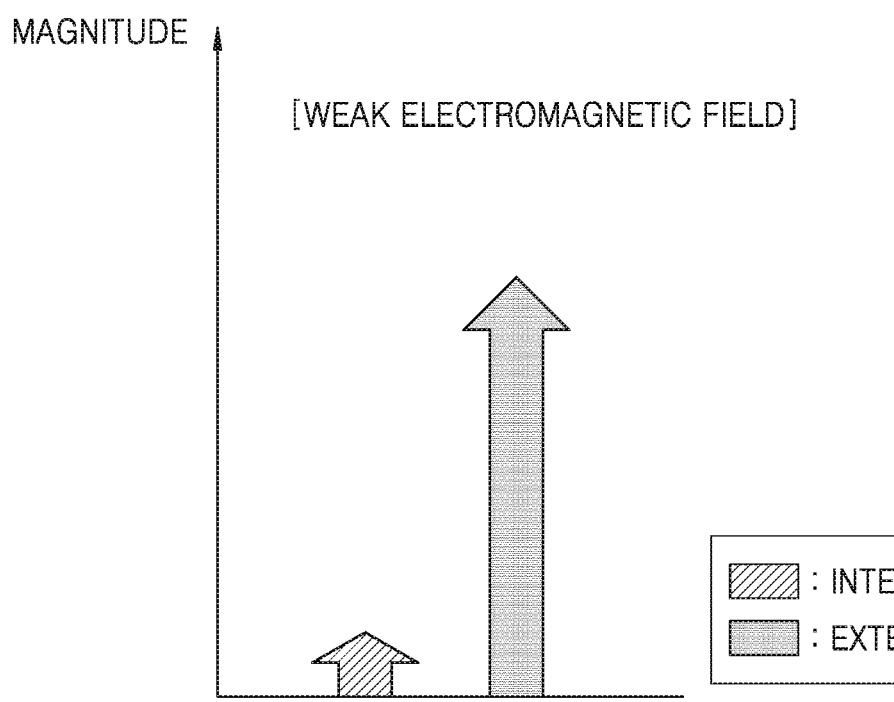

FIGS. 5A and 5B are graphs of magnitudes of noise in the strong and weak fields of the wireless communication device 100, respectively. Hereinafter, the internal noise of the wireless communication device 100 may include noise generated at a receiving end such as a mixer and an analog-digital converter (ADC) included in the wireless communication device 100, and may correspond to noise in which noise components changing according to the received signal strength and white noise components are combined. Accordingly, the internal noise may be increased in proportion to the downlink channel state quality. The external noise of the wireless communication device 100 may include thermal noise, have the same magnitude or dispersion regardless of the antenna, and be increased in proportion to temperature.

Referring to FIG. 5A, because the magnitude of the internal noise of the wireless communication device 100 is relatively greater than that of the external noise in the strong field, the internal noise may need to be carefully considered when the transmission power compensation operation of the SRS of each antenna in the strong field is performed. The internal noise and the received signal strength of the wireless communication device 100 may be proportional to the downlink channel quality. Because the received power of each of the SRSs needs to be the same as or similar to each other so that the cell 112 estimates the downlink channel by using the channel reciprocity in the strong field when the SRSs are sequentially received from the antennas of the wireless communication device 100, the wireless communication device 100 may compensate for the transmission power of the SRS of each antenna considering the downlink channel state quality and the internal path loss.

Referring to FIG. 5B, because the magnitude of the external noise of the wireless communication device 100 is relatively greater than that of the internal noise in the weak field, the external noise may need to be carefully considered when the transmission power compensation operation of the SRS of each antenna in the weak field is performed. The wireless communication device 100 may compensate for the transmission power of the SRS of each antenna considering the internal path loss so that the cell 112 estimates the downlink channel by using channel reciprocity in the weak field.

Figure 6:
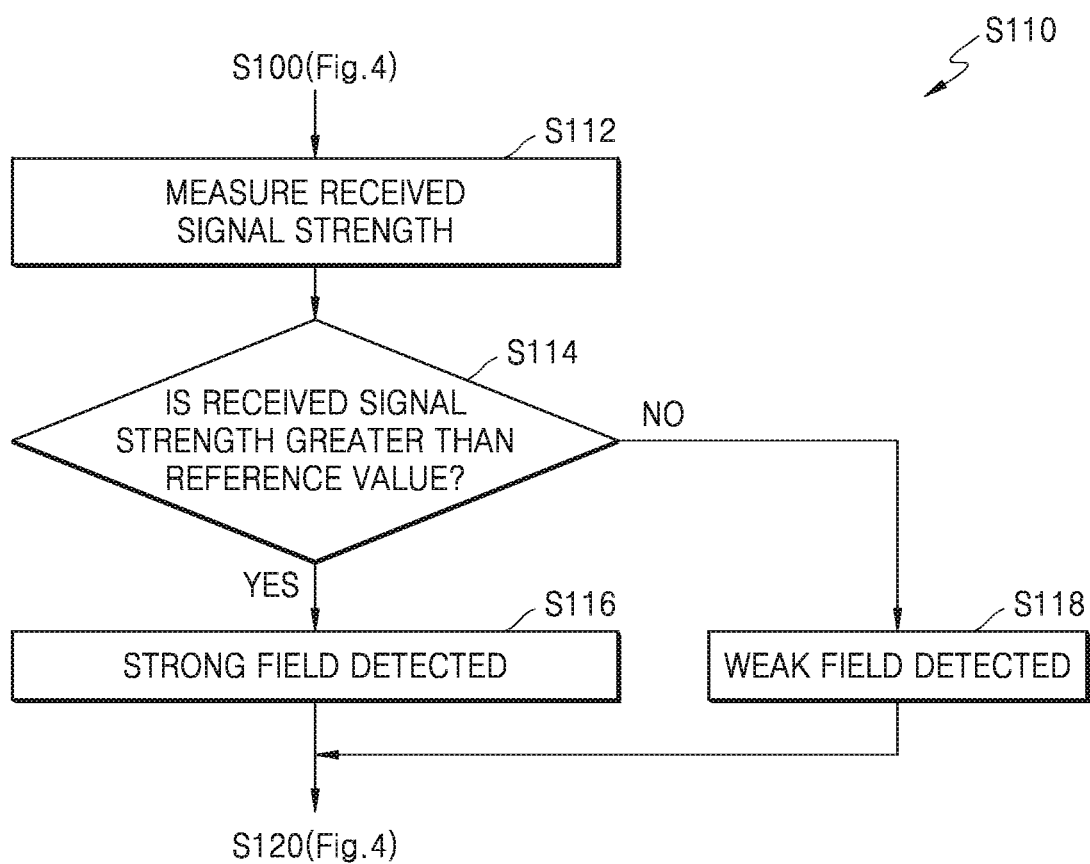
FIG. 6 is a detailed flowchart of operation S110 in FIG. 4.

FIG. 6 is a detailed flowchart of operation S110 in FIG. 4.

Referring to FIG. 6, after operation S100 in FIG. 4, the wireless communication device 100 may measure the received signal strength from the reference signal included in the first downlink signal (S112). For example, the wireless communication device 100 may measure the received signal strength for the reference signal received of each antenna, and obtain one piece of received signal strength by obtaining an average value from the plurality of received signal strengths. The wireless communication device 100 may compare the measured received signal strength with a preset reference value (S114). When a result of operation S114 is 'Yes', the wireless communication device 100 may be determined to be in the strong field, and when the result of operation S114 is 'No', the wireless communication device 100 may be determined to be in the weak field. Next, the wireless communication device 100 may perform operations subsequent to operation S120 in FIG. 4.

Figure 7:
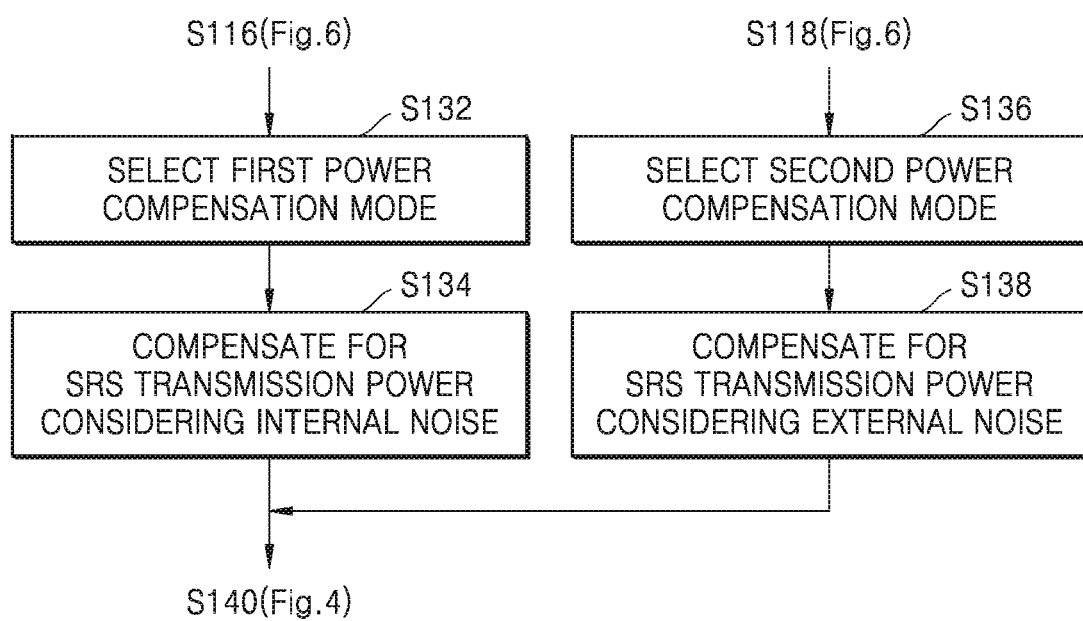
FIG. 7 is a flowchart of operation S120 in FIG. 4.

FIG. 7 is a flowchart of operation S120 in FIG. 4.

Referring to FIG. 7, subsequent to operation S116 in FIG. 6, the wireless communication device 100 may select the first power compensation mode when the wireless communication device 100 is in the strong field (S132). The wireless communication device 100 may compensate for the transmission power of the SRS of each antenna considering the internal noise (S134). Subsequent to operation S118 in FIG. 6, the wireless communication device 100 may select the second power compensation mode when the wireless communication device 100 is in the weak field (S136). The wireless communication device 100 may compensate for the transmission power of the SRS of each antenna considering the external noise (S138). Subsequent to operation S134 or operation S138, the wireless communication device 100 may perform operation S140 in FIG. 4.

Figure 8:
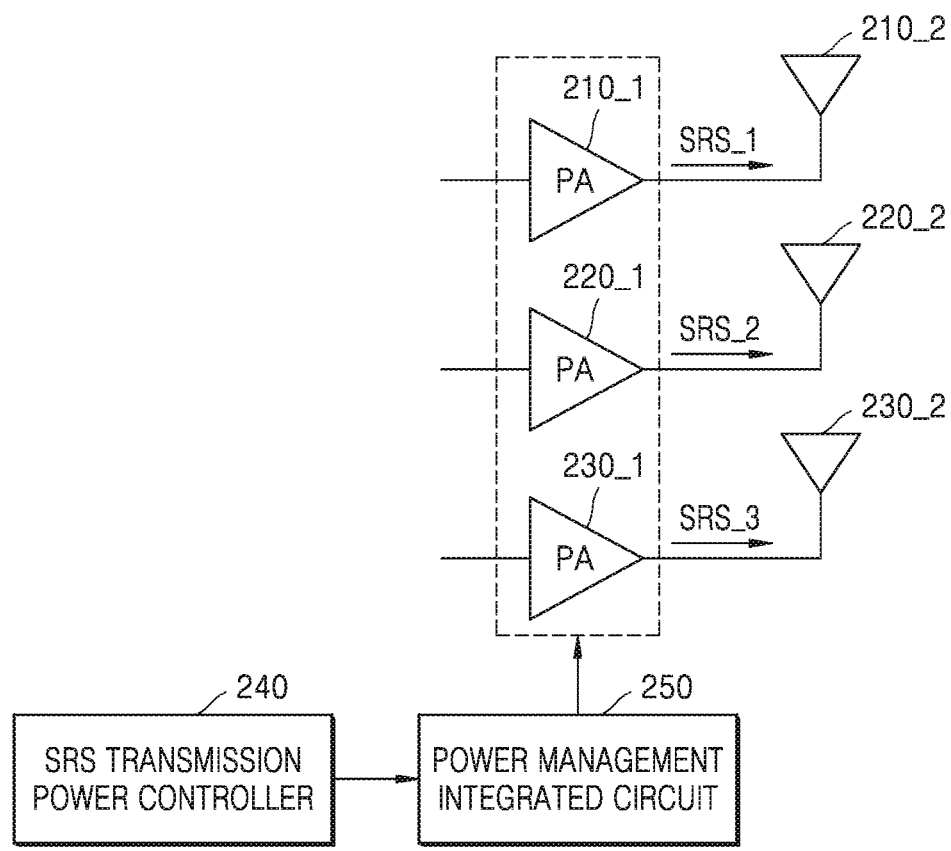
FIG. 8 is a block diagram for describing a compensating method of transmission power of the SRS of each antenna, according to an example embodiment of the inventive concept.

FIG. 8 is a block diagram for describing a compensating method of the transmission power of the SRS of each antenna, according to an example embodiment of the inventive concept. This example will be discussed for explanatory purposes assuming there are three antennas included in the wireless communication device 100; more or fewer antennas may be provided in other examples.

The wireless communication device 100 of FIG. 8 may include first through third power amplifiers 210_1 through 230_1, first through third antennas 210_2 through 230_2, an SRS transmission power controller 240, and a power management integrated circuit 250. In an example embodiment, the SRS transmission power controller 240 may use the power management integrated circuit to compensate for the transmission power of the first through third SRSs SRS_1 through SRS_3 that are transmitted via the first through third antennas 210_2 through 230_2. The power management integrated circuit 250 may adjust each gain of the first through third power amplifiers 210_1 through 230_1 by respectively biasing the first through third power amplifiers 210_1 through 210_3 in response to a control signal received from the SRS transmission power controller 240.

For example, in the weak field, the SRS transmission power controller 240 may compensate for the transmission power of the first SRS SRS_1 by biasing the first power amplifier 210_1 via the power management integrated circuit 250 considering the internal loss path from the first power amplifier 210_1 to the first antenna 210_2. The SRS transmission power controller 240 may compensate for the transmission power of the second SRS SRS_2 by biasing the second power amplifier 220_1 via the power management integrated circuit 250 considering the internal loss path from the second power amplifier 220_1 to the second antenna 220_2. The SRS transmission power controller 240 may compensate for the transmission power of the third SRS SRS_3 by biasing the third power amplifier 230_1 via the power management integrated circuit 250 considering the internal loss path from the third power amplifier 230_1 to the third antenna 230_2.

In addition, in the strong field, the SRS transmission power controller 240 may compensate for the transmission power of the first SRS SRS_1 by biasing the first power amplifier 210_1 via the management integrated circuit 250 considering the internal loss path from the first power amplifier 210_1 to the first antenna 210_2 and the downlink channel quality corresponding to the first antenna 210_2. The SRS transmission power controller 240 may compensate for the transmission power of the second SRS SRS_2 by biasing the second power amplifier 220_1 via the management integrated circuit 250 considering the internal loss path from the second power amplifier 220_1 to the second antenna 210_2 and the downlink channel quality corresponding to the second antenna 220_2. The SRS transmission power controller 240 may compensate for the transmission power of the third SRS SRS_3 by biasing the third power amplifier 230_1 via the management integrated circuit 250 considering the internal loss path from the third power amplifier 230_1 to the third antenna 230_2 and the downlink channel quality corresponding to the third antenna 230_2.

Thereafter, the first through third antennas 210_2 to 230_2 may be sequentially selected, and output the first through third SRSs SRS_1 through SRS_3 in which the transmission power has been compensated in the strong field or weak field, respectively.

The method of compensating for the transmission power of the SRS described in FIG. 8 is only an example embodiment, and the inventive concept is not limited thereto. Various compensation methods such as compensating for the transmission power of the SRS by adjusting a magnitude of a signal input to each of the first through third power amplifiers 210_1 through 210_3.

FIG. 9 depicts a table (Table 1) for describing a power compensation parameter corresponding to each antenna in FIG. 8.

Referring to FIGS. 8 and 9, the power compensation parameter calculator 154 (FIG. 2) may generate the first and second transmit power compensation parameters corresponding to the first to third antennas 210_2 to 230_2, and the received power compensation parameter.

The power compensation parameter operator 154 (FIG. 2) may generate first transmission power compensation parameters $PM_{TX1,1}$ to $PM_{TX1,3}$ according to the internal path loss corresponding to the first through third antennas 210_2 through 230_2, respectively. As an example embodiment, the first transmission power compensation parameters $PM_{TX1,1}$ to $PM_{TX1,3}$ may have values proportional to the internal path loss corresponding to the first through third antennas 210_2 through 230_2, respectively.

The power compensation parameter operator 154 (FIG. 2) may generate the first transmission power compensation parameters $PM_{RX,1}$ to $PM_{RX,3}$ according to the downlink channel quality corresponding to the first through third antennas 210_2 through 230_2, respectively. The received power compensation parameters $PM_{RX,1}$ to $PM_{RX,3}$ may have values inversely proportional to the downlink channel quality corresponding to the first through third antennas 210_2 through 230_2, respectively.

The power compensation parameter operator 154 (FIG. 2) may generate a second transmission power compensation parameter by using the first transmission power compensation parameter and the received power compensation parameter. The power compensation parameter operator 154 (FIG. 2) may generate the second transmission compensation parameters $PM_{TX2,1}$ to $PM_{TX2,3}$ by multiplying the first transmission compensation parameters $PM_{TX1,1}$ to $PM_{TX1,3}$ corresponding to the first through third antennas 210_2 through 230_2 by the received power compensation parameters $PM_{RX,1}$ to $PM_{RX,3}$, respectively.

The SRS transmit power controller 240 may compensate for the transmission power of the first through third SRSs SRS_1 through SRS_3 via the power management integrated circuit 250 with reference to Table 1. The data of Table 1 may be stored in memory within the wireless communication device 100, and the power compensation parameter operator 154 (FIG. 2) may update Table 1 periodically or aperiodically.

Figure 10:
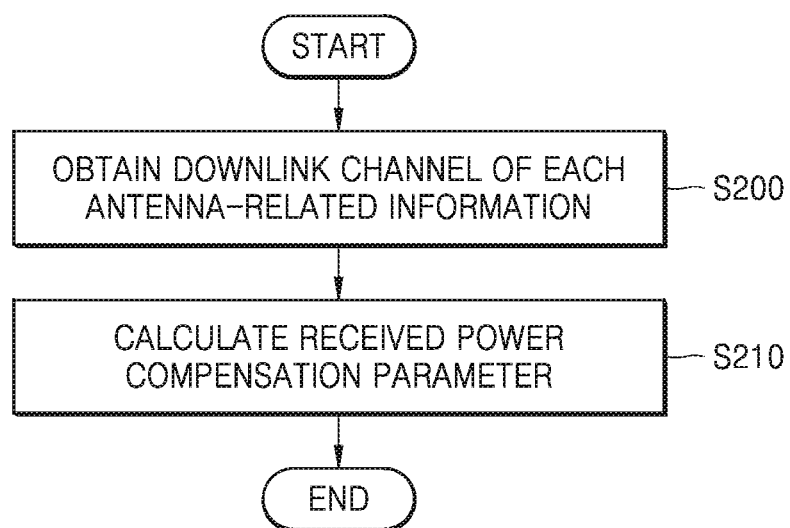
FIG. 10 is a flowchart of an operation of a power compensation parameter operator in FIG. 2.

FIG. 10 is a flowchart of an operation of the power compensation parameter operator 154 in FIG. 2.

Referring to FIGS. 2 and 10, the power compensation parameter operator 154 may obtain downlink channel-related information of each antenna (S200). The power compensation parameter 154 may estimate the downlink channel of each antenna by using a pilot signal received from each of the first through $m^{th}$ antennas 110_1 through 110_m, and the downlink channel quality may be recognized via the estimated downlink channel of each antenna. The power compensation parameter operator 154 may calculate the received power compensation parameter of each antenna by using the downlink channel-related information of each antenna (S210).

Figure 11:
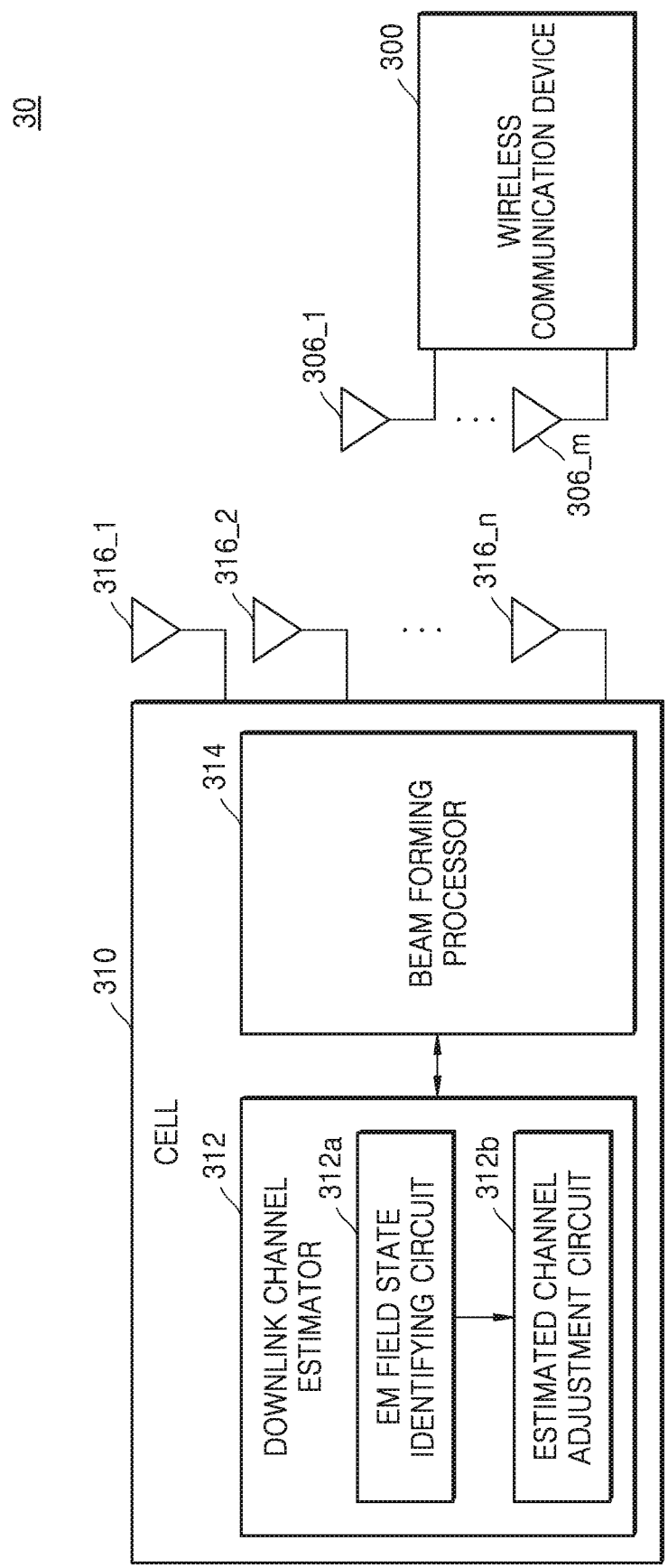
FIG. 11 is a block diagram of a wireless communication system according to an example embodiment of the inventive concept.

FIG. 11 is a block diagram of a wireless communication system 30 according to an example embodiment of the inventive concept. Hereinafter, a wireless communication device 300 is described on the assumption that it operates only in the second power compensation mode in all field states.

Referring to FIG. 11, the wireless communication system 30 may include the wireless communication device 300 and a cell 310. The wireless communication device 300 may include first through $m^{th}$ antennas 306_1 through 306_m. The cell 310 may include a downlink channel estimator 312, a beamforming processor 314, and first through $n^{th}$ antennas 316_1 through 316_n.

The downlink channel estimator 312 may estimate the downlink channel of each antenna of the wireless communication device 300 from the uplink signal received from the wireless communication device 300. In an example embodiment, the uplink signal may include the SRSs sequentially transmitted from the first through $m^{th}$ antennas 306_1 through 306_m, and the downlink channel estimator 312 may estimate the uplink channel of each antenna of the wireless communication device 300 by using the SRSs, and estimate or obtain the downlink channel of each antenna of the wireless communication device 300 from the uplink channel of each antenna of the wireless communication device 300 that is estimated based on the channel reciprocity.

The downlink channel estimator 312 may include a field state identifying circuit 312a and an estimation channel adjustment circuit 312b. The EM field state identifying circuit 312a may identify the field state of the wireless communication device 300. In an example embodiment, the field state identifying circuit 312a may identify the field state of the wireless communication device 300 by using channel state information of the wireless communication device 300 that is included in the uplink signal, or may identify the field state of the wireless communication device 300 by using an uplink power control command that is transmitted to the wireless communication device 300. Furthermore, the field state identifying circuit 312a may identify the field state of the wireless communication device 300 by using the SRSs sequentially transmitted from the first through $m^{th}$ antennas 306_1 through 306_m of the wireless communication device 300. The uplink signal may include data indicating whether the above-described "strong field state" or "weak field state" was detected by the antenna transmitting the SRS. The uplink signal may also include "downlink channel state-related information" such as the RSSI and/or the RSRP measured at device 300. Note that the above-mentioned channel state information is an example of downlink channel state-related information.

The estimation channel adjustment circuit 312b may adjust the estimated downlink channel of each antenna of the wireless communication device 300 based on the field state of the wireless communication device 300 that has been identified by the field state identifying circuit 312a, and based on the other downlink channel state-related information. As an example embodiment, the estimation channel adjustment circuit 312b may adjust the estimated downlink channel of each antenna of the wireless communication device 300 only when the field state of the wireless communication device 300 is the strong field. In other words, in the strong field, although the SRSs are transmitted with the same or similar transmission power via the first through $m^{th}$ antennas 306_1 through 306_mr, after experiencing the uplink channel of each antenna, the received power of the respective SRSs received by the cell 310 may be different depending on the uplink channel quality of each antenna. In other words, the received power of the SRSs received by the cell 310 may vary depending on the uplink channel of each antenna. Considering this, when the SRSs received by the cell 310 have the same or similar received power by adjusting the downlink channel of each antenna that has been estimated by the downlink channel estimator 312, a downlink equivalent channel of each antenna may be generated.

In an example embodiment, when the field state of the wireless communication device 300 is the strong field, the estimated channel adjustment circuit 312b may calculate a bundle unit average of the downlink channels of each antenna of the wireless communication device 300, and may adjust the downlink channel of each antenna by using the bundle unit average of the downlink channel of each antenna.

In an example embodiment, an operation of the estimation channel adjustment circuit 312b may be expressed as follows.

$$h_{E,i,j,f} = \sqrt{\frac{n \times N_{F,k}}{\sum_{f \in F_{bundle,k}} \sum_{i=1}^{n} \| h_{SRS,i,j,f} \|^2}} \times h_{SRS,i,j,f} \quad \text{(eqn. 6)}$$

In eqn. 6, $h_{SRS,i,j,f}$ is the downlink channel between the i$^{th}$ antenna 316_i of the cell 310 and the j$^{th}$ antenna 306_j of the wireless communication device 300, and $h_{E,i,j,f}$ is a downlink equivalent channel between the i$^{th}$ antenna 316_i of the cell 310 in which $h_{SRS,i,j,f}$ has been adjusted and generated and the j$^{th}$ antenna of the wireless communication device 300. The bundle may be a frequency unit that determines the beamforming matrix in the beamforming processor 314. The bundle may be defined as a minimum unit including a plurality of resource elements in which an identical precoding operation is performed and interleaved. $F_{bundle,k}$ is a k$^{th}$ bundle, and $h_{SRS,i,j,f}$ is a downlink channel in an f$^{th}$ subcarrier included in the k$^{th}$ bundle. $N^{F,k}$ is the number of subcarriers included in the k$^{th}$ bundle.

The estimation channel adjustment circuit 312b may generate the equivalent downlink channel of each antenna $h_{SRS,i,j,f}$ by multiplying an inverse $$\sqrt{\frac{n \times N_{F,k}}{\sum_{f \in F_{bundle,k}} \sum_{i=1}^{n} \| h_{SRS,i,j,f} \|^2}}$$

of the average downlink channel in the bundle unit by the estimated downlink channel of each antenna $h_{E,i,j,f}$ based on eqn. 6.

In a general fading channel environment, because the power fluctuation for each frequency domain is large, performance may degrade, and thus the estimation channel adjustment circuit 312b may perform a spectral power flattening operation.

As an example embodiment, the estimation channel adjustment circuit 312b may perform power adjustment for the uplink signal received from the j$^{th}$ antenna 306_j as follows.

$$g_{bundle,k,j} = \sqrt{\frac{\sum_{f \in F} \sum_{i=1}^{n} \| h_{SRS,i,j,f} \|^2}{N_{bundle} \times \sum_{f \in F_{bundle,k}} \sum_{i=1}^{n} \| h_{SRS,i,j,f} \|^2}} \qquad \text{(eqn. 7)}$$

In eqn. 7, $g_{bundle,k,j}$ is a parameter for power adjustment for the uplink signal received from the j$^{th}$ antenna 306_j, and $N_{bundle}$ is the total number of bundles. $g_{bundle,k,j}$ may be obtained by dividing an average of $h_{SRS,i,j,f}$ for the entire frequency domain by a multiple product of an average of $h_{SRS,i,j,f}$ in a frequency domain corresponding to $F_{bundle,k}$ and the total number of bundles. The estimation channel adjustment circuit 312b may generate parameters for all bundles including $g_{bundle,k,j}$, and based on this, may perform a spectral power flattening operation.

Figure 12:
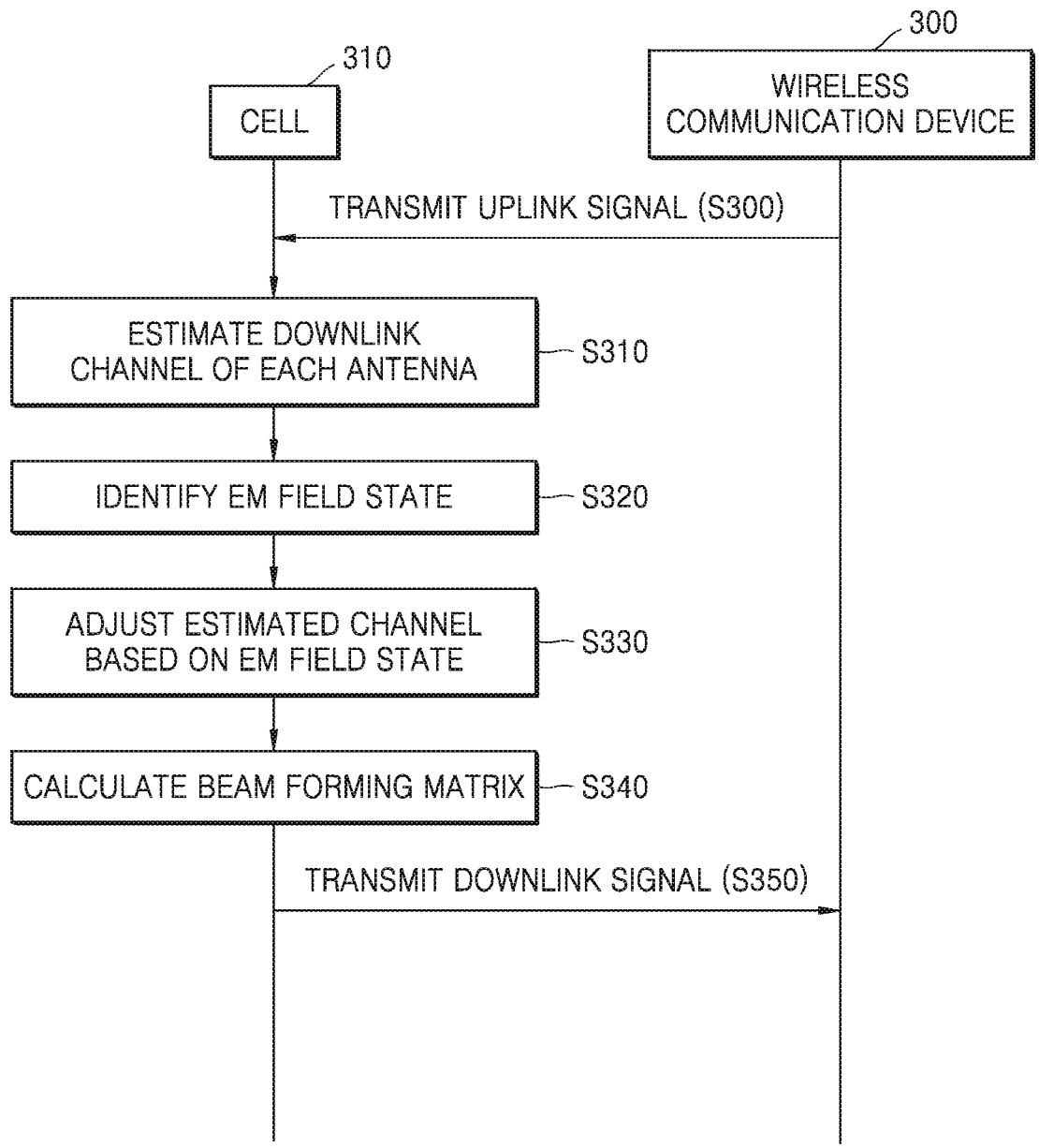
FIG. 12 is a flowchart of an operating method of a wireless communication system, according to an example embodiment of the inventive concept.

FIG. 12 is a flowchart of an operating method of a wireless communication system, according to an example embodiment of the inventive concept.

Referring to FIG. 12, the wireless communication system may include the wireless communication device 300 and the cell 310, and the wireless communication device 300 may transmit the uplink signal to the cell 310 (S300). The uplink signal may include the SRSs respectively transmitted from different antennas of the wireless communication device 300. The cell 310 may estimate the downlink channel of each antenna of the wireless communication device 300 by using the SRSs included in the uplink signal (S310). The cell 310 may estimate the uplink channel of each antenna of the wireless communication device 300 based on the SRSs, and may obtain the downlink channel of each antenna of the wireless communication device 300 from the estimated uplink channel of each antenna considering the channel reciprocity. The cell 310 may identify the field state of the wireless communication device 300 (S320). The uplink signal may include channel state information and the like transmitted from the wireless communication device 300. The channel state information may include the RSRP, the RSSI, and the like measured by the wireless communication device 300, and the cell 310 may identify the field state of the wireless communication device 300 by using the channel state information. The cell 310 may adjust the estimated downlink channel of each antenna of the wireless communication device 300 based on the field state of the wireless communication device 300 (S330). The cell 310 may calculate the beamforming matrix by using the adjusted downlink channel of each antenna of the wireless communication device 300 (S340). The cell 310 may generate the downlink signal by using the calculated beamforming matrix, and transmit the generated downlink signal to the wireless communication device 300 via the plurality of antennas of the cell 310 (S350).

Figure 13:
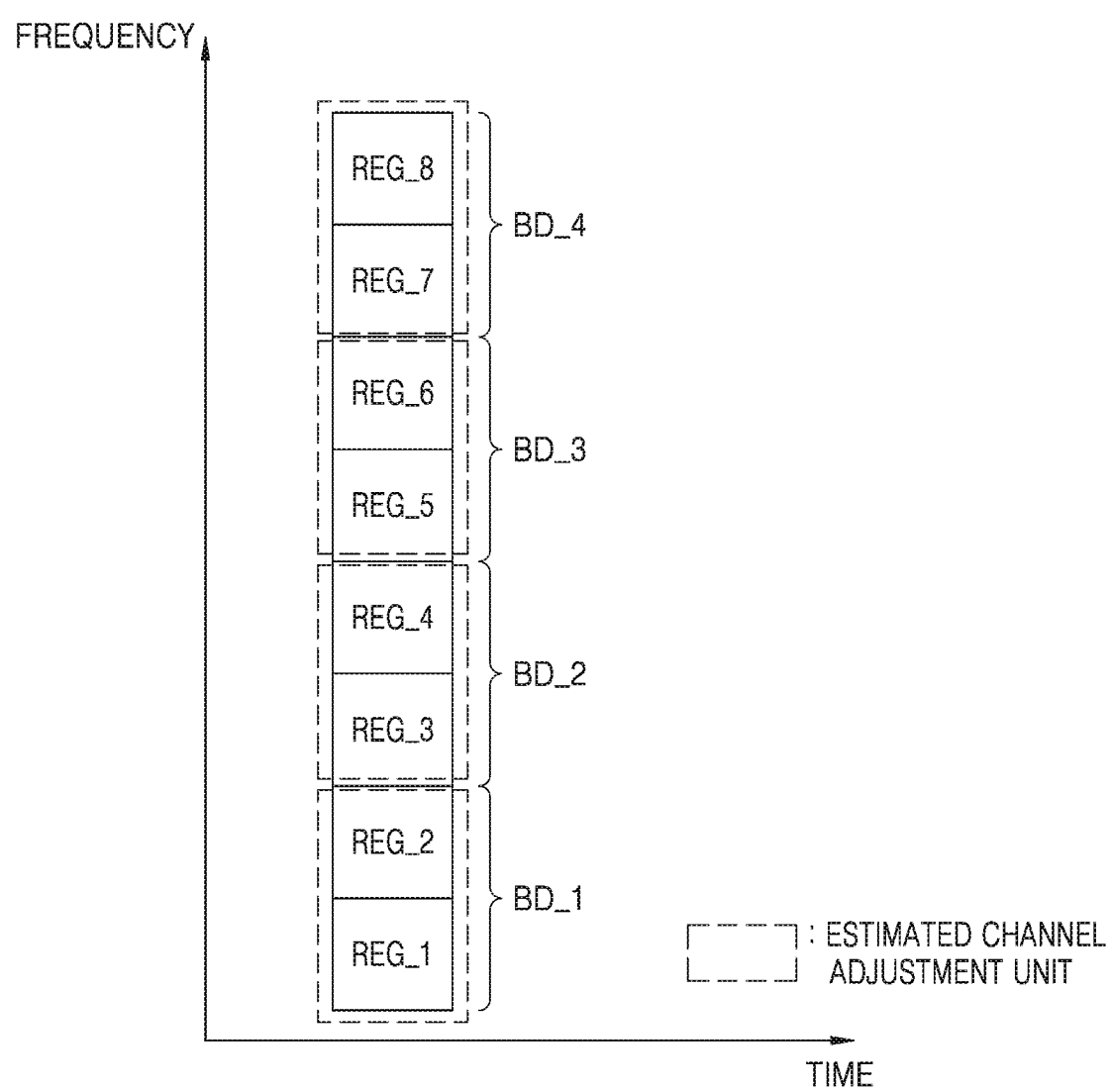
FIG. 13 is a diagram of an operation of an estimation channel adjustment circuit in FIG. 11.

FIG. 13 is a diagram of an operation of the estimation channel adjustment circuit 312b in FIG. 11. The bundles illustrated in FIG. 13 are only example embodiments; other bundle implementations may be substituted.

Referring to FIG. 13, the wireless communication device 300 may transmit the SRS in the frequency domain corresponding to first through fourth bundles BD_1 through BD_4 to the cell 310 via the j$^{th}$ antenna 306_j. The first bundle BD_1 may include first and second resource element groups REG_1 and REG_2, the second bundle BD_2 may include third and fourth resource element groups REG_3 and REG_4, the third bundle BD_3 may include fifth and sixth resource element groups REG_5 and REG_6, and the fourth bundle BD_4 may include seventh and eighth resource element groups REG_7 and REG_8.

The cell 310 may estimate the downlink channel between the cell 310 corresponding to the j$^{th}$ antenna 306_j and the wireless communication device 300 by using the SRS. The estimation channel adjustment circuit 312b may calculate a bundle unit average for the estimated downlink channel when the wireless communication device 300 is in the strong field, and adjust the estimated downlink channel by using the bundle unit average. For example, the estimation channel adjustment circuit 312b may calculate a first channel average corresponding to the first bundle BD_1, and adjust the estimated downlink channel corresponding to the first bundle BD_1 by using the first channel average. In this manner, the estimation channel adjustment circuit 312b may calculate averages of the second through fourth channels respectively corresponding to the second through fourth bundles BD_2 through BD_4, and may adjust the estimated downlink channels corresponding to the second through fourth bundles BD_2 through BD_4 by using the averages of the second through fourth bundles BD_2 through BD_4, respectively.

Figure 14:
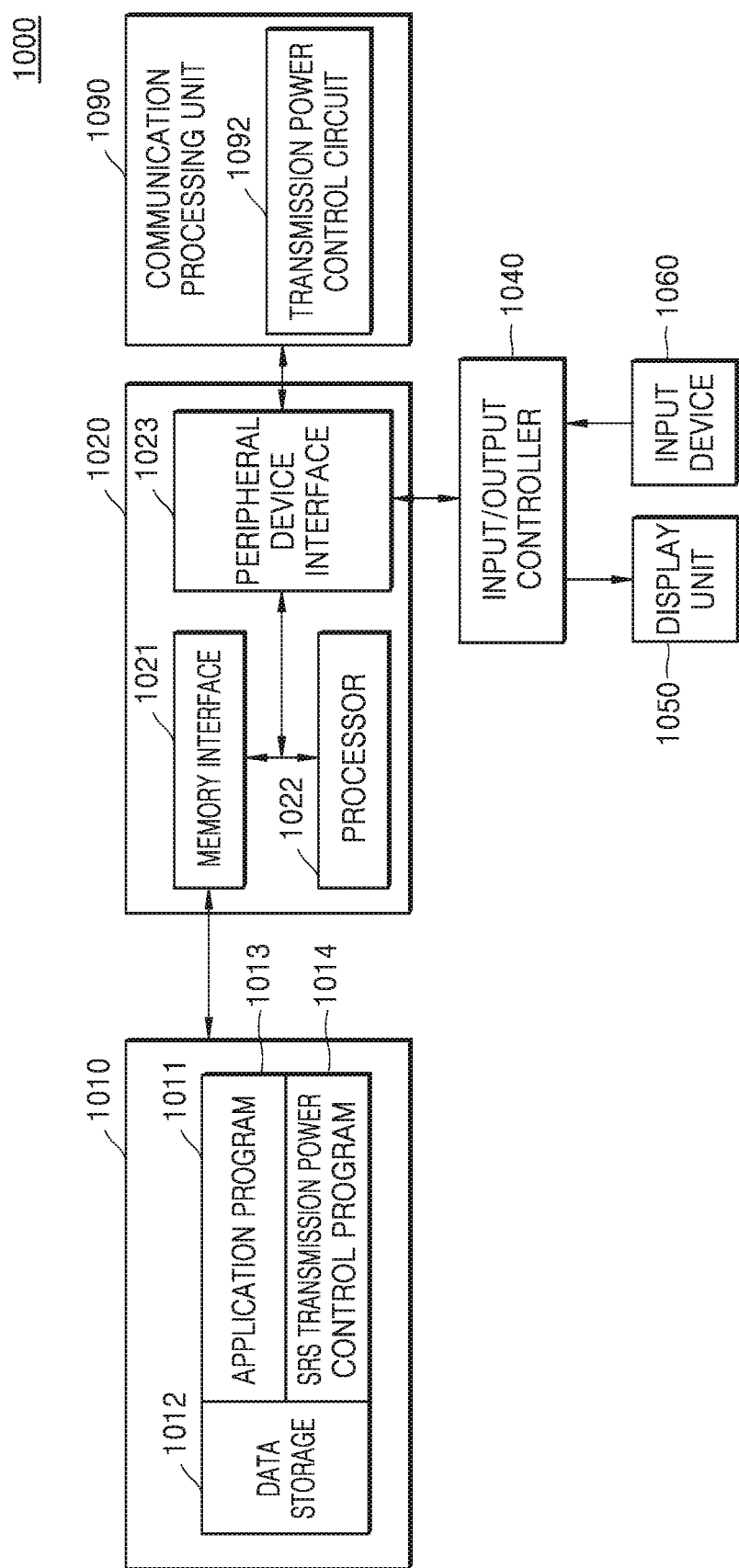
FIG. 14 is a block diagram illustrating an electronic device that supports a transmission power compensation function of the SRS, according to an example embodiment of the present disclosure.

FIG. 14 is a block diagram of an electronic device 1000 that supports a transmission power compensation function of the SRS, according to an example embodiment of the inventive concept.

Referring to FIG. 14, the electronic device 1000 may include a memory 1010, a processor unit 1020, an input/output controller 1040, a display unit 1050, an input device 1060, and a communication processing unit 1090. Here, the memory 1010 may be plural. Components are as follows.

The memory 1010 may include a program storage unit 1011 for storing programs for controlling an operation of the electronic device 1000 and a data storage unit 1012 for storing data generated during program execution. The data storage unit 1012 may store data required for operations of an application program 1013 and an SRS transmission power control program 1014. The program storage unit 1011 may include the application program 1013 and the SRS transmission power control program 1014. In this case, programs included in the program storage unit 1011 may include sets of instructions and may be expressed as instruction sets.

The application program 1013 may include application programs operable in the electronic device 1000. In other words, the application program 1013 may include application instructions executed by a processor 1022.

The processor 1022 may execute the SRS transmission power control program 1014, and compensate for the transmission power of each antenna of the electronic device 1000 for transmitting the SRS according to example embodiments of the inventive concept. In other words, the processor 1022 may select a power compensation mode based on the field state of the electronic device 1000 by executing the SRS transmission power control program 1014, and compensate for the transmission power of each antenna for transmission of the SRS based on the selected power compensation mode.

The electronic device 1000 may include the communication processing unit 1090 that performs a communication function for voice communication and data communication, and the communication processing unit 1090 may include a transmission power control circuit 1092 controlled by the processor 1022 for compensating for the transmission power of each antenna described above with respect to FIG. 1 and the like. A memory interface 1021 may control access to the memory 1010 of components such as the processor 1022 or a peripheral device interface 1023. The peripheral device interface 1023 may control connection of an input/output peripheral device of the BS to the processor 1022 and the memory interface 1021.

The input/output controller 1040 may provide an interface between an input/output device such as the display unit 1050 and the input device 1060 and the peripheral device interface 1023. The display unit 1050 may display status information, input characters, moving pictures, still pictures, etc. For example, the display unit 1050 may display information about an application program executed by the processor 1022.

The input device 1060 may provide input data generated by a selection of the electronic device 1000 to the processor unit 1020 via the input/output controller 1040. In this case, the input device 1060 may include a keypad including at least one hardware button and a touchpad for sensing touch information. For example, the input device 1060 may provide via the input/output controller 1040 the touch information such as a touch, a touch movement, and a touch release that have been sensed by the touch pad to the processor 1022.

While the inventive concept has been particularly shown and described with reference to example embodiments thereof, it will be understood by one of ordinary skill in the art that various changes in form and details may be made therein without departing from the spirit and scope of the inventive concept as defined by the following claims. Accordingly, the true scope of protection of the inventive concept should be determined by the technical idea of the following claims.

What is claimed is:

1. An operating method of a wireless communication system comprising a cell and a wireless communication device configured to communicate with each other, the method comprising:
    identifying, by the wireless communication device, an electromagnetic field state from a downlink signal received by an antenna of the wireless communication device from the cell;
    when the identified electric field state is a strong electromagnetic field state, compensating, by the wireless communication device, transmission power of a sounding reference signal transmitted through the antenna using a second transmission power compensation parameter generated through use of a first transmission power compensation parameter corresponding to an internal path loss to the antenna and a received power compensation parameter corresponding to a downlink channel state of the antenna; and
    transmitting, by the wireless communication device, the sounding reference signal to the cell with the compensated transmission power.

2. The method of claim 1, wherein, when the identified electromagnetic field state is a weak field state, the method further comprises compensating the transmission power of the sounding reference signal using the first transmission power compensation parameter.

3. The method of claim 1, wherein the first transmission power compensation parameter has a value proportional to the internal path loss, and
    the received power compensation parameter has a value inversely proportional to the downlink channel state.

4. The method of claim 1, further comprising:
    estimating, by the cell, the downlink channel of the antenna based on the sounding reference signal received from the wireless communication device;
    calculating, by the cell, a beam forming matrix based on the estimated downlink channel of the antenna; and
    transmitting, by the cell, a downlink signal generated based on the calculated beam forming matrix to the wireless communication device.

5. The method of claim 1, wherein the identifying of the electromagnetic field state further comprises:
    measuring received signal strength from the downlink signal;
    determining whether the measured received signal strength exceeds a reference value; and
    identifying the electromagnetic field state as the strong field state or the weak field state based on the determination result.

6. The method of claim 5, wherein the received signal strength comprises at least one of reference signal received power (RSRP), synchronization received power (SCH_RP), reference signal received quality (RSRQ), a signal-to-interference-and-noise ratio (SINR), and a received signal strength indicator (RSSI).

* * * * *